United States Patent [19]

Shimizu et al.

[11] Patent Number: 4,482,992
[45] Date of Patent: Nov. 13, 1984

[54] SKIP/ARM SERVO SYSTEM FOR A VIDEO DISC PLAYER

[75] Inventors: Keizo Shimizu; Katunobu Takeda; Tokinori Furuichi; Masao Oguri, all of Yokohama; Junichi Ikoma, Yokosuka, all of Japan

[73] Assignee: Hitachi, Ltd., Tokyo, Japan

[21] Appl. No.: 361,541

[22] Filed: Mar. 23, 1982

[30] Foreign Application Priority Data

Mar. 25, 1981 [JP] Japan .................. 56-42397

[51] Int. Cl.³ .................. H04N 5/76; G11B 21/00
[52] U.S. Cl. .................. 369/221; 358/907; 369/43; 369/47; 369/219
[58] Field of Search .................. 358/907, 342; 369/43, 369/44, 47, 50, 111, 220, 221, 219, 226; 360/78

[56] References Cited

U.S. PATENT DOCUMENTS

4,262,174 4/1981 Bleazey .................. 369/221
4,310,914 1/1982 Riddle .................. 369/43

Primary Examiner—Robert L. Richardson
Attorney, Agent, or Firm—Antonelli, Terry & Wands

[57] ABSTRACT

A skip/arm servo system for a video disc player comprises a device adapted to skip a signal sensing element, such as a stylus for detection of information recorded on a disc, in a direction crossing a recording track, a stylus position detector adapted to detect the relative position of the stylus to a cartridge movably mounting the stylus, a comparator comparing the detected relative position with a reference relative position to produce an error output, a cartridge driver responsive to the error output to move the cartridge so as to maintain the stylus in the reference relative position. A setting device is adapted to variably set the reference relative position in accordance with a reproduction mode selected by the operator, whereby a special mode reproduction can readily be accomplished or the stylus can be readily released from a locked groove in the disc.

8 Claims, 8 Drawing Figures

SKIP/ARM SERVO SYSTEM FOR A VIDEO DISC PLAYER

CROSS-REFERENCES OF THE RELATED APPLICATIONS

This application relates to a U.S. application Ser. No. 321,761 filed on Nov. 13, 1981, now U.S. Pat. No. 4,400,807, entitled "STYLUS POSITION DETECTING APPARATUS" by T. Furuichi et al. and based on Japanese patent application No. 55-159489 (Nov. 14, 1980) and assigned to the present assignee.

BACKGROUND OF THE INVENTION

This invention relates to a video disc player having a concentric or spiral recording track and more particularly to a video disc player with a skip mechanism and an arm servo system which can realize a stable regular mode playback or reproduction and a special playback in a mode such as a search mode, as fast forward mode or a fast reverse mode.

In a video disc player with a spiral recording track serving as guide grooves, a scratched or defective groove due to faulty manufacturing or ensuing careless handling and use gives rise to an undesired condition called "locked groove". In order for a signal sensing element or a stylus used in a very high-density disc (VHD) system or a capacitance electronic disc (CED) system to escape from the locked groove, there is required a skip mechanism which can forcibly move the signal sensing element or stylus from the locked groove to a normal groove.

Figure 1:
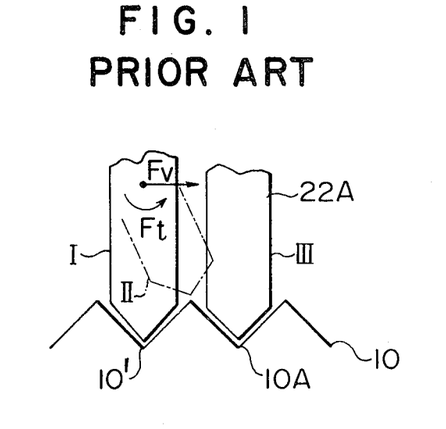
FIG. 1 is a diagrammatic representation showing the relation positional relative between the stylus tip and the disc groove for regular reproduction or skipping in a video disc player.

To explain a conventional skip function, reference should be made to FIG. 1 which shows a relative positional relation between a stylus tip 22A for disc signal detection and a grooved disc 10. The stylus is typically carried on a pickup arm or cantilever which is supported movably in both vertical and lateral directions. In FIG. 1, while the stylus postures as shown at solid lines (I) and (III) during regular reproduction, it postures as shown by a chained line (II) during its shifting from (I) position to (III) position, namely, during the skip operation.

As will be understood easily, it is necessary to apply to the signal sensing element, a stylus horizontal drive force $F_V$ which is vertical to the direction of the groove and torque $F_t$ about the center of gravity of the stylus tip 22A during the skip operation as shown at arrows in FIG. 1.

According to an experiment conducted by the present inventors, under the application of only the horizontal drive force $F_V$, the stylus tip 22A sometimes shifts excessively across several of tens of grooves, for example. An excessive shifting exerts a corresponding reaction on the stylus tip 22A and the stylus tip 22A is forced to finally shift in a direction opposite to an intended direction.

Under the application of only the torque $F_t$, the stylus tip 22A merely rotates and the probability of skip shifting is decreased considerably.

Figure 2:
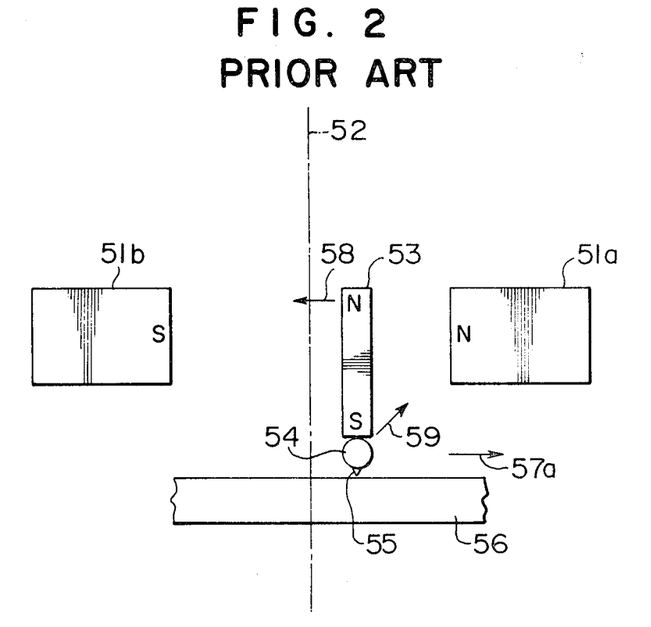
FIG. 2 is a schematic diagram of one example of a conventional skip device.

Illustrated in FIG. 2 is a conventional known technique for providing the skipper function. In FIG. 2, there are seen skip coils 51a and 51b, a skip magnet 53, a cantilever 54, a pickup stylus 55, and a video disc 56.

The pickup stylus 55 is supported by the cantilever 54 and scans along a signal groove in the video disc 56 a recording signal recorded in the signal groove. The cantilever 54 is pivoted at its center of gravity, and the skip magnet 53 is fixedly secured to the cantilever 54 with its S pole, for example, located close to the cantilever and its N pole remote therefrom.

The skip coils 51a and 51b are disposed on both sides of the skip magnet 53 as shown in FIG. 2. The skip magnet 53, cantilever 54 and pickup stylus 55 are offset from a center line 52 between the skip coils 51a and 51b toward the periphery of the video disc 56 i.e. in the forward direction of the spiral groove.

Normally, while scanning and reproducing a recording signal on the video disc 56, the pickup stylus 55 moves toward the periphery of the video disc 56, namely, in the forward direction 57a of the pickup stylus 55. The moving rate is given by equation (1):

$$2.66 \ \mu m \times 7.5 \ rps \div 20 \ \mu m/sec \quad (1)$$

where 2.66 μm is a track groove pitch on the video disc pursuant to the CED system standard and 7.5 rps corresponds to a disc revolution of 450 rpm.

In the event that the pickup stylus 55 faces a defective signal groove in the video disc 56 and is prevented from moving in the forward direction 57a, resulting in a phenomenon called "locked groove" in which the same signal is reproduced repeatedly, the pickup stylus 55 is required to forcibly jump to another groove in the forward direction 57a of the pickup stylus 55.

Conventionally, upon occurrence of the locked groove, currents are fed to the skip coils 51a and 51b so that one skip coil 51a opposing the skip magnet 53 may produce an N pole, for example, and the other skip coil 51b may produce an S pole as shown in FIG. 2.

With the magnetic poles thus produced by the skip coils 51a and 51b, the N pole of the skip coil 51a exerts attractive force 59 on the S pole of skip magnet 53 close to the cantilever 54 in an obliquely upward direction and repulsive force 58 on the N pole of skip magnet 53 remote from the cantilever 54 in substantially the horizontal direction toward the S pole of the skip coil 51b.

As a result, the pickup stylus 55 is slightly rotated about the pivotal fulcrum of the cantilever 54 and raised so as to jump to another groove in the forward direction, thereby escaping from the locked groove.

Unless the pickup stylus 55 is offset from the center line 52 toward the periphery of the video disc in contrast to the precedence, the force 59 for obliquely raising the S pole of skip magnet 53 close to the cantilever 54 becomes insufficient and the skip operation for causing the pickup stylus to forcibly jump over the signal groove in the video disc 56 becomes almost impossible.

Based on the skip operation, a fast reproduction is carried out as will be described below. In a video disc player of the CED system, 8-field pictures are recorded for one revolution. When the skip operation is effected by picking up a vertical synchronizing signal added between picture fields, it is possible to obtain an $8+1=9$ times fast forward reproduction and an $8-1=7$ times fast reverse reproduction.

The skip operation effected by picking up the vertical synchronizing signal is effective to suppress display of noise due to the skip operation (background noise) on the playback screen.

The 9 times fast forward reproduction can be accomplished by sequential escape from the locked groove. But, to accomplish the 7 times fast reverse reproduction, the skip coils 51a and 51b must produce opposite magnetic poles to those of FIG. 2 and must be adjusted so as to be offset from the center line 52 between the skip coils 51a and 51b in a direction opposite to the forward direction 57a shown in FIG. 2. Such an adjustment, when taking the eccentricity of the video disc into consideration, is difficult to achieve and practically, the fast reverse reproduction is almost impossible.

In the video disc player, the signal sensing element such as for example the stylus is supported by a cartridge such as an arm. The signal sensing element may also be supported in a suspension fashion as in a two-dimension tracker of the VHD system or a three-dimension actuator of the optical disc player. When the stylus is moved for reproduction, the relative position of the stylus to the pickup arm or cartridge must be held constant. To this end, an arm servo mechanism is provided which detects the relative position between the stylus and the cartridge and brings a detected value into coincidence with a preset value or a reference value.

The arm servo mechanism itself is disclosed in the background of the invention in the above-mentioned Furuichi et al patent and will not be detailed herein.

With the conventional skip mechanism and the arm servo mechanism, simultaneous production of both the torque $F_t$ and the horizontal drive force $F_V$ which is vertical to the groove was difficult to achieve. In addition, it was practically impossible to optimize the torque and the horizontal drive force in accordance with condition of the locked groove, in other words, it is difficult to attain the sequential movement of the stylus over grooves upon the special reproduction and the jump of the stylus over a desired number of grooves in the event of occurrence of the locked groove.

SUMMARY OF THE INVENTION

An object of the present invention is to provide a video disc player which can control the jump of the signal sensing element over a desired number, singular or plural, of grooves (tracks) for steady escape from the locked groove to thereby assure a stable regular reproduction function and a stable special reproduction function as well.

To accomplish the above object, according to this invention, the reference relative position between the signal sensing element and the pickup arm or cartridge is made variable in accordance with the reproduction mode such as a regular mode, four times mode, ten times mode, sixty times mode or reverse mode.

BRIEF DESCRIPTION OF THE DRAWINGS

In the figures, like characters and reference numerals represent like elements and parts.

DESCRIPTION OF THE PREFERRED EMBODIMENTS

Prior to describing preferred embodiments of the present invention, a skip device of the type applicable to the present invention will first be explained which is disclosed in Japanese Patent Application No. 56-26816 by Takeda, one of the present inventors, filed on Feb. 27, 1981. Specifically, the disclosed skip device is adapted for a video disc player comprising a pick up stylus for scanning a video disc formed with guide grooves, a cantilever for supporting the pickup stylus, a skip magnet mounted on the cantilever and fixed thereto, and a pair of skip coils spaced apart from each other on both sides of the skip magnet to surround the skip magnet. The cantilever and the skip magnet are disposed approximately in the middle of the paired skip coils, and the center axis passing through magnetic poles of the paired skip coils is substantially aligned with one magnetic pole of skip magnet close to the cantilever. The diameter of winding of each skip coil is so selected that magnetic flux produced by each skip coil under current conduction therethrough will create an obliquely downward attractive force which acts on the other magnetic pole of the skip magnet remote from the cantilever. With this type of skip device, the escape from the locked groove and the fast forward or reverse reproduction can readily be accomplished by changing the direction of passage of current through the skip coils.

Figure 3:
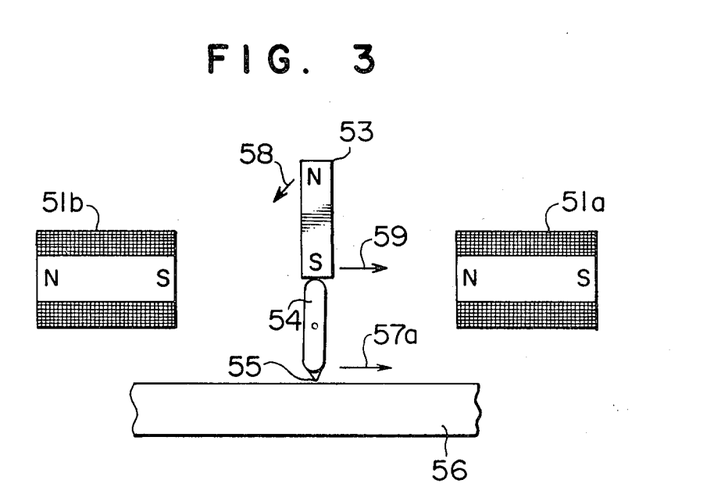
FIG. 3 is a schematic diagram of a skip device applicable to the present invention, especially, being in operation for the escape from the locked groove and fast forward reproduction.
Figure 4:
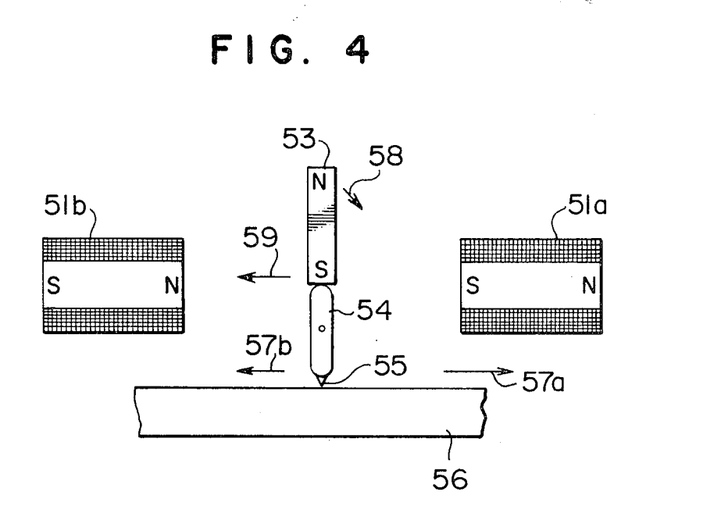
FIG. 4 is a schematic diagram of the skip device applicable to the invention, especially, being in operation for the fast reverse reproduction.

Referring now to FIGS. 3 and 4, the skip device as outlined above will be described in greater detail. In contrast to the skip device of FIG. 2, the positional relation seen from FIGS. 3 and 4 clearly shows that the center axis passing through skip coils 51a and 51b is substantially in registration with a magnetic pole of skip magnet 53 close to a cantilever 54, and that the skip magnet 53, cantilever 54 and pickup stylus 55 are disposed approximately in the middle of the skip coils 51a and 51b. When one skip coil 51a produces an N pole and the other skip coil 51b produces an S pole, a relatively large force 59 is exerted on an S pole of the skip magnet 53 close to the cantilever 54 by the N pole of the skip coil 51a in a direction approximately aligned with the center axis of the magnetic pole of skip coil 51a.

Concurrently therewith, a relatively small force 58 is exerted on an N pole of skip magnet 53 remote from the cantilever 54 by the S pole of the skip coil 51b in an obliquely downward direction.

Consequently, a pickup stylus 55 is slightly rotated counterclockwise about the pivotal fulcrum of the cantilever 54 and raised so as to jump to another groove in the leading direction, thus accomplishing the escape from the locked groove.

A 9-times fast forward reproduction can be carried out by sequentially effecting the above skip operation in synchronism with each vertical synchronizing signal, and a 5-times fast forward reproduction can be carried out by sequentially effecting the above skip operation in synchronism with one out of two vertical synchronizing signals.

For a reverse reproduction, the polarity of magnetic poles of the skip coils 51a and 51b is inverted as compared to that of FIG. 3 and the direction of force acting on the S and N poles of the skip magnet 53 is changed as shown in FIG. 4. As a result, the pickup stylus 55 is caused to jump in a direction 57b opposite to the forward direction 57a shown in FIG. 3, thus accomplishing the reverse reproduction.

A 7-times fast reverse reproduction can be carried out by sequentially effecting the above reverse skip operation in synchronism with each vertical synchronizing signal, and a still reproduction can be carried out by effecting the reverse skip operation in synchronism with one revolution of the video disc.

In this example, since obliquely downward force 58 and horizontal force 59 must act on the S and N poles of the skip magnet 53 in accordance with the polarity of magnetic poles of the skip coils 51a and 51b as shown in FIGS. 3 and 4, the size of the skip coils 51a and 51b is automatically limited.

It the skip coils 51a and 51b has an excessively small winding diameter, the lower magnetic pole of the skip magnet 53 will deviate from the field region of the skip coil when the pickup stylus 55 vertically reciprocate to scan on the video disc 56.

On the other hand, if the skip coil has an excessively large winding diameter, force 58 will approximately equal force 59 and they will act in parallel but opposite directions, so that the obliquely downward force 58 disappears which is necessary for the skipper operation about the pivotal fulcrum of the cantilever 54.

According to an experiment, good results can be obtained by making the winding diameter of skip coils 51a and 51b approximately equal to the length (distance between N and S poles) of skip magnet 53 and arranging the skip magnet 53 such that its lower pole close to the cantilever 54 lies on the center axis of the skip coils 51a and 51b.

The present invention develops the skip device and the technique of the arm servo system disclosed in the Furuichi et al patent. The disclosure of the U.S. patent to Furuichi et al is incorporated by reference in the present application.

The operational principle of the present invention will now be described briefly.

Figure 5:
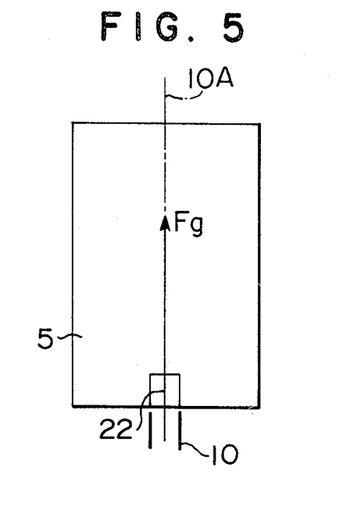
FIGS. 5 and 6 are diagrams useful in explaining force acting on the stylus tip when reproducing.
Figure 6:
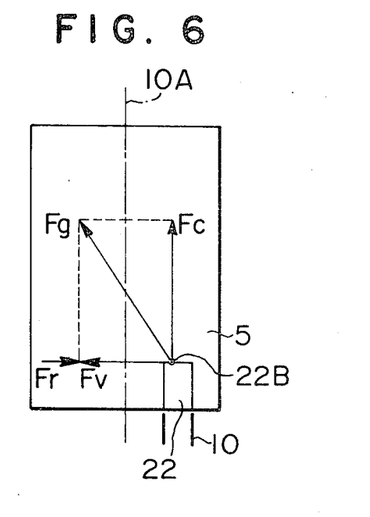

Referring to FIGS. 5 and 6, there is shown the relative position between the signal sensing element 22 and the cartridge 5. Especially, FIG. 5 shows a case where the center axes of the cartridge 5 and signal sensing element or stylus 22 lie on the center axis 10A of the disc groove 10. FIG. 6 shows a case where the center axis of the stylus 22 is offset from the center axis 10A of the disc groove.

With the stylus 22 centered with the disc groove as shown in FIG. 5, drawing force $F_g$ acting on the stylus 22 is in parallel with the center axis 10A of the disc groove. In contrast, with the stylus 22 not centered with the disc groove, drawing force $F_g$ is decomposed into a centripetal component $F_c$ at the rotation center 22B and a horizontal drive component $F_v$ which is vertical to the groove. The offset state as shown in FIG. 6 takes place when the arm is stationary and the stylus is leading along the groove or when only the arm is offset.

The stylus rotation center 22B is supported by a resilient support. Accordingly, when the stylus 22 is in condition as shown in FIG. 6, a recovery force $F_r$ is created to return the stylus to a free position.

Resultant force of the horizontal drive component $F_v$ and recovery force $F_r$ due to resiliency constitutes a main component which determines the horizontal drive force $F_v$ as explained with reference to FIG. 1. Therefore, the horizontal drive force $F_v$ required can be controlled by changing the relative position between cartridge 5 and the stylus 22.

Change of the relative position between the cartridge and stylus can be accomplished by, for example, changing the position detection reference voltage value in the stylus position detecting apparatus in the Furuichi et al. patent previously mentioned.

The torque $F_t$ shown in FIG. 1 can be controlled by changing the driving degree of the skip device as shown in FIGS. 3 and 4 in accordance with the degree of locked groove and the reproduction mode. Also, the driving degree of the skip device can be changed by controlling the supply of power to the skip coils previously mentioned with reference to FIGS. 3 and 4 through the change of the amount of current passage in the skipper coil, or the magnitude or application time of voltage applied to the skipper coil.

Figure 7:
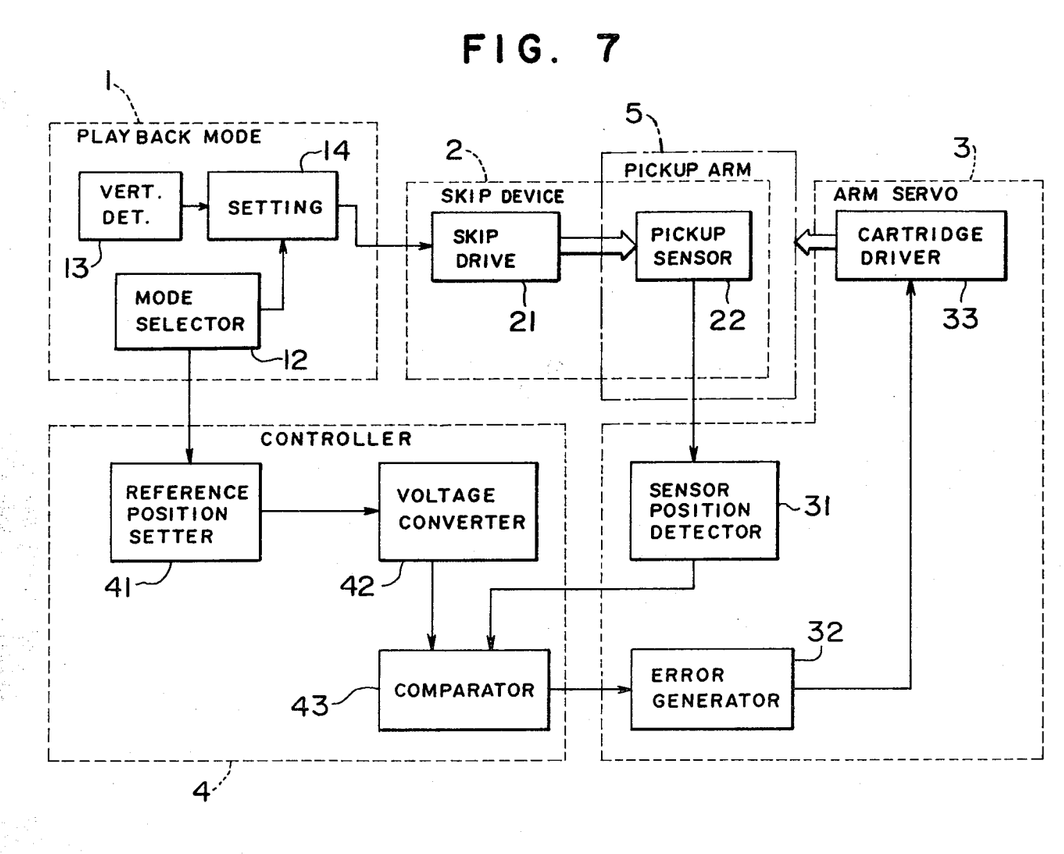
FIG. 7 is a block diagram showing one embodiment of the invention.

Turning to FIG. 7, there is illustrated a skip/arm servo system embodying the invention as applied to particular-mode reproduction. The system as shown in block form in FIG. 7 comprises an input signal generator 1 for generating a signal adapted for a playback mode, a skip device 2, an arm servo 3, a controller 4 and a cartridge or pickup arm 5 for housing the signal sensing element or pickup sensor 22.

Practically, the cartridge 5 may sometimes contain the skip device 2 and part or entirety of the arm servo 3 but for simplicity of illustration, the cartridge 5 shown in FIG. 7 is exemplified to incorporate only the pickup sensor 22.

The input signal generator 1 includes a mode selector 12 for selection of the playback mode at the will of the operator, a vertical fly-back line period detector 13 for discriminating a vertical fly-back pulse contained in the reproduction signal from the video disc, and a setting unit 14 for permitting the supply of output to a skip driver 21 only when outputs from the mode selector 12 and the vertical fly-back line period detector 13 are present.

The skip device 2 includes the skip driver 21. The arm servo 3 includes a sensor position detector 31 as disclosed in the Furuichi et al patent, for example, an error generator 32 and a cartridge driver 33. The controller 4 includes a reference position setter 41, a voltage converter 42 and a comparator 43. The mode selector 12 and reference position setter 41 may be constituted by, for example, a 4 bit microcomputer Hitachi HD 38800.

The input signal generator 1 generates a signal in accordance with the playback mode such as a regular mode, fast forward mode or fast reverse mode and supplies the signal to the skip driver 21 and the reference position setter 41. The manner of reference position setting will specifically be described later.

The reference position setter 41 determines the relative position of the sensor 22 to the cartridge 5. The relative position set by the reference position setter 41 is converted by the voltage converter 42 into a reference signal and fed to the comparator 43.

The actual position of the sensor 22 relative to the cartridge 5, on the other hand, is always monitored by the sensor position detector 31 and a signal representative of a sensor position is fed to the comparator 43. The comparator 43 compares the reference signal with the detected position signal to produce an error which is sent to the error generator 32.

An output signal of the error generator 32 is fed to the cartridge driver 33 and based on this signal, the driver 33 drives the cartridge 5. Through the operation of the arm servo 3, the position of the sensor 22 relative to the cartridge 5 is always held to a value set by the reference position setter 41.

In the fast forward or reverse mode, the skip driver 21 included in the skip device 2 is energized by the signal from the mode selector 12 included in the input signal generator 1. As a result, the sensor 22 skips over one or a plurality of grooves. Concurrently, the mode selector 12 delivers a signal corresponding to the selected operation to the reference position setter 41 of the controller 4, and a reference position set by this signal operates the arm servo 3. It should be appreciated that the conventional skip function is responsive to only the detection of missing of signals.

The above arrangement can afford to provide an $(a \cdot m \cdot n + 1)$ times special (fast) reproduction, where a: the number of fields recorded during one revolution of the video disc;

n: reciprocal of the number of fields scanned during a period between one skipping of sensor 22 and the subsequent skipping thereof; and m: the number of grooves over which one skipping of sensor 22 jumps; positive or negative dependent on the direction of skipping.

For m being negative, the direction of the sensor 22 driven by the skip driver 21, the value of the reference position setter 41 and the attendant driving direction of the cartridge by the cartridge driver 33 are obviously required to be inverted.

As described above, this embodiment can assure not only the regular reproduction but also the fast forward or reverse reproduction, the slow forward or reverse reproduction or the repetitions reproduction on the same groove ($n=1$, $a \cdot m \cdot n = -1$).

In the video disc player, as will be seen from the foregoing, it is also necessary to consider the manner of escaping from the locked groove phenomenon due to defective grooves.

Figure 8:
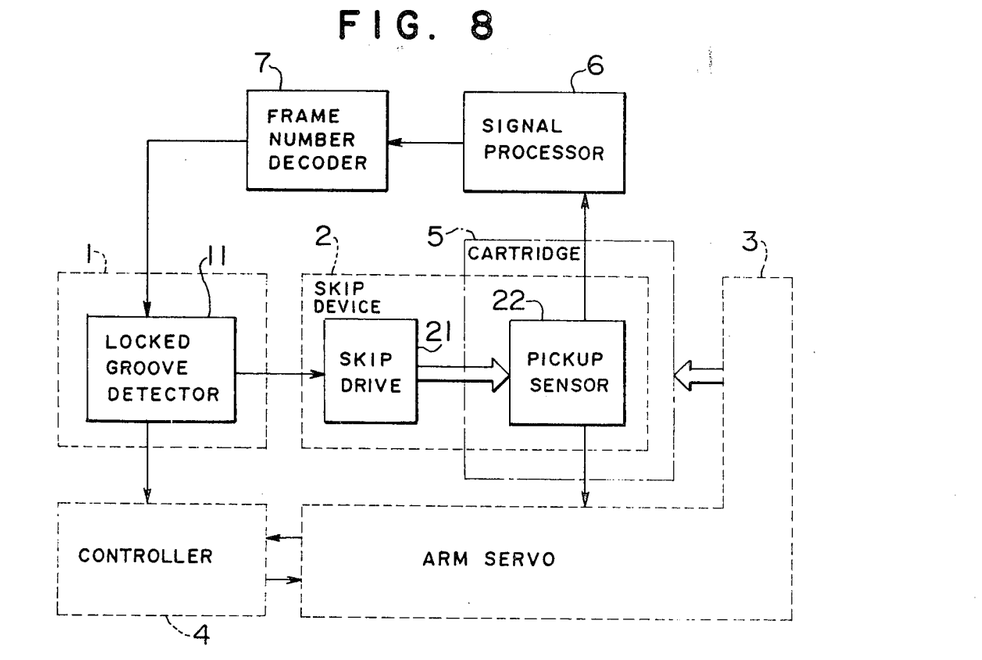
FIG. 8 is a block diagram showing another embodiment of the invention.

FIG. 8 shows, in block form, another embodiment of the invention with a locked groove release function.

A signal processor 6 is adapted to demodulate and amplify a pickup signal from the pickup sensor 22 which is representative of a modulated video signal recorded on the video disc and frame number information corresponding to the picture field.

A frame number decoder 7 derives frame number information alone from the information delivered from the signal processor 6, detects an updated frame number by incrementing of number counter, for example, and processes the updated information into an information format which is accessible by a locked groove detector 11.

Assuming that a regular forward reproduction is carried out, the frame number which is incremented one by one will be detected by the frame number decoder 7. In this case, if four picture frames, for example, are recorded on one recording circle, the four frames will be reproduced repeatedly in the event of occurrence of the locked groove phenomenon. Namely, the frame number will be updated abnormally.

The locked groove detector 11 constituted by, for example, a 4 bit microcomputer Hitachi HD 38800 judges that the locked groove has taken place when the increment value of the frame number becomes minus and informs the input signal generator 1 of the occurrence of the locked groove phenomenon. In response thereto, the input signal generator 1 supplies a skip signal to the skip driver 21. The normal skip operation is carried out by this skip signal and the stylus 22 is caused to forcibly skip over one groove, thereby escaping from the locked groove condition.

If the escape from the locked groove is not completed by the single skip operation, the input signal generator 1 will further supply to the skip driver 21 a signal that permits skipping over 2 or 3 or more grooves.

Accordingly, this embodiment can assure rapid escape from the locked groove even when the defective groove is of a large scale.

In this case, the signal from the input signal generator to the reference position detector 41, which signal controls the setting of the reference position for the arm servo, is also set in accordance with the number of skipping grooves by the stylus 22 as shown in Table 1.

Generally, for the regular reproduction, the relative position of the stylus 22 to the cartridge 5 is preferably such that the stylus 22 is centered with the cartridge as shown in FIG. 5. However, for forward skipping, it is preferable that the cartridge 5 lead the stylus 22 in the forward direction (normally toward the periphery of the video disc). Conversely, for reverse skipping, it is preferable that the cartridge 5 lag with respect to the stylus 22.

According to an experiment conducted by the present inventors, good results were obtained by selecting the relation between the number of skipping grooves and the relative position as shown in Table 1.

TABLE 1

| Direction | Skip Groove number | Distance (μm) | Relative position |
|---|---|---|---|
| Forward | Several to several of tens | 50~100 | Cartridge leads |
| Forward | Several of tens | 150~200 | " |
| Reverse | Several to several of tens | 50~100 | Cartridge lags |
| Reverse | Several of tens | 150~200 | " |

In this case, when two opposing skip coils each having 140 turns are spaced apart 7 mm and they are supplied with a low DC voltage of 6 to 12 V so as to be driven by a pulse current, good forward and reverse skipping operations were attained with the following current pulse widths (conduction time):

(1) For skipping over several to several of tens of grooves: 100 to 200 msec.

(2) For skipping over several of tens of grooves: 300 to 500 msec.

As has been described, according to the invention, the relative position of the stylus to the cartridge is changeable with the playback mode so that optimized horizontal drive force and torque can always be applied to the stylus tip.

This permits extremely smooth and steady regular reproduction and special-mode reproduction such as fast forward or reverse reproduction as well as rapid and steady escape from the locked groove condition.

While, in the foregoing, the invention has been applied to the video disc player having guide grooves, the fundamental technical concept of the present invention wherein the relative position of the stylus to the cartridge is selectively set in accordance with the playback mode may be applicable to a video disc player of the other type which has no guide grooves but has a spiral or concentric recording track.

We claim:

1. A skip/arm servo system for a video disc player wherein a signal sensing element scans a video disc having concentric recording tracks or recording tracks in the form of a spiral recording track recorded with information to at least one of detect, process and reproduce the recorded information therefrom, said system comprising:

means for generating a skip control signal;

skipping means responsive to the skip control signal for skipping said signal sensing element in a direction crossing the recording track to shift said sensing element from one recording track to another recording track;

means for detecting the relative position of said signal sensing element to a cartridge mounting said signal sensing element and for providing an output indicative thereof;

means for setting a predetermined reference relative position of said sensing element to said cartridge and for providing an output indicative thereof;

comparator means for comparing the output indicative of the detected relative position with the output indicative of the predetermined reference position for producing an error output when the detected and reference relative position outputs are different;

means for moving the cartridge in response to the error output from said comparator means so as to constantly maintain said signal sensing element in the reference relative position of said sensing element to said cartridge; and said means for generating the skip control signal generating the skip control signal in accordance with a selected reproduction mode of the video disc player and said means for setting the predetermined reference relative position setting the predetermined reference relative position in accordance with the selected reproduction mode.

2. A skip/arm servo system according to claim 1, wherein said tracks are grooved tracks and said sensing signal element is associated with a grooved track for sensing a signal therefrom, further comprising:

means for decoding a frame number of a video signal from the recorded information detected by said signal sensing element;

locked groove detecting means for detecting occurrence of a locked groove condition wherein said signal sensing element maintains its association with a grooved track from a non-updated condition of the recorded frame number;

said skip control means generating a skip signal to said skipping means when the locked groove is detected; and correcting means connected between said reference relative position setting means and said locked groove detecting means, for correcting the reference relative position for said selected reproduction mode in accordance with the magnitude of the locked groove condition detected by said locked groove detecting means.

3. A skip/arm servo system according to claim 1 or 2, wherein said skip control generating means includes a mode selector for selecting the reproduction mode, a fly-back line period detector for discriminating a vertical fly-back line pulse contained in a reproduction signal from the video disc, and means responsive to the output of said vertical fly-back line pulse detector to supply the skip control signal to said skipping means, said reference relative position setting means comprising a voltage converter adapted to generate a voltage corresponding to a reference relative position which is determined in accordance with the actuation of said mode selector, said comparator means receiving the reference voltage at its reference input terminal and the output of said relative position detecting means at its comparison input terminal, the output of said relative position detecting means being a voltage indicative of the detected relative position.

4. A skip/arm servo system according to claim 2, wherein said locked groove detecting means and said correcting means are constituted by a microcomputer.

5. A skip/arm servo system according to claims 1 on 2, wherein said video disc is rotated at a constant angular velocity, the information recording track has guide grooves, and said signal sensing element is a pickup stylus supported by a cantilever.

6. A skip/arm servo system for a video disc player wherein a video disc having grooved concentric recording tracks or grooved recording tracks in the form of a spiral recording track recorded with information is rotated at a constant speed and the recorded information is detected by a pickup stylus associated with a grooved track for at least one of processing and reproduction of the recorded information therefrom, said system comprising:

means for generating a skip control signal;

skipping means responsive to the skip control signal for skipping said pickup stylus in a direction crossing the recording track to shift said pickup stylus from one track to another track;

position detecting means for detecting the relative position of said pickup stylus to a cartridge movably mounting said pickup stylus and providing an output indicative thereof;

comparator means for comparing the output indicative of the detected relative position with an output indicative of a predetermined reference relative position of said pickup stylus to said cartridge for producing an error output when the detected and reference relative position outputs are different;

means for moving the cartridge in response to the error output from said comparator means to maintain said pickup stylus in the reference relative position to said cartridge;

means for decoding a frame number of a video signal from the recorded information detected by said pickup stylus;

locked groove detecting means for detecting occurrence of a locked groove condition wherein said pickup stylus maintains its association with the grooved track from a non-updated condition of the decoded frame number;

means for setting the output of the reference relative position provided to said comparator means in accordance with the detected locked groove condition detected by said locked groove detecting means; and said means for generating the skip control signal to said skipping means being responsive to detection of a locked groove condition detected by said locked groove detecting means for supplying the skip control signal to said skipping means.

7. A skip/arm video servo system according to claim 6, wherein said means for setting the output of the reference relative position includes means for initially setting the output of the predetermined reference relative position provided to said comparator means, and means for changing the setting of the output of the predetermined reference relative position in accordance with the detected locked groove condition.

8. A skip/arm servo system according to claim 1 or 7, wherein said skip control signal generating means generates as the skip control signal a pulse signal having a pulse width in dependence upon the magnitude of the skip.

* * * * *